May 27, 1952

J. H. SHARP 2,598,138

PHONOGRAPH CHANGE-SPEED MECHANISM

Filed April 14, 1949

2 SHEETS—SHEET 1

INVENTOR.
John H. Sharp
BY Dawson & Dawson
Attys.

May 27, 1952 J. H. SHARP 2,598,138

PHONOGRAPH CHANGE-SPEED MECHANISM

Filed April 14, 1949 2 SHEETS—SHEET 2

INVENTOR.
John H. Sharp
BY Dunning & Dunning
Attys.

Patented May 27, 1952 2,598,138

UNITED STATES PATENT OFFICE 2,598,138

PHONOGRAPH CHANGE-SPEED MECHANISM

John H. Sharp, Chicago, Ill.

Application April 14, 1949, Serial No. 87,445

11 Claims. (Cl. 74—199)

This invention relates to a unitary apparatus applicable to a conventional phonograph to provide a turntable which may be rotated at any selected one of several speeds.

For a number of years last past phonographs have been constructed for turntable operation at 78 R. P. M. Millions of disc records have also been prepared for use with turntables having such a speed of rotation. In the recent past other records have been offered on the market which require a playing speed of 33⅓ R. P. M., and still others a playing speed of 45 R. P. M. For either of these slow-playing records it is necessary that there be provided a phonograph having a turntable whose speed of rotation is approximately that for which the record is designed.

The prospect which the public now faces is dismaying. Those who have phonographs with playing speed of 78 R. P. M. are unable to utilize therewith the newer records which call for playing speeds around 33⅓ R. P. M. or 45 R. P. M., and since these slower playing records offer certain definite advantages the owner of an existing phonograph finds himself at a disadvantage. If it were possible to adapt his existing machine to the slower playing records, or to apply to such a machine an apparatus which would reduce the playing speed properly, then the way would be open for the use of many records of high quality which at present are denied him. The acquisition of one or more additional phonographs operating at the requisite slower speed required by these newer type of records, is a heavy burden which few can assume.

The apparatus of this invention is designed to solve these difficulties in a very simple and inexpensive way. It comprises a change-speed mechanism in unitary form which can be readily applied to the conventional phonograph of the present day. No tools are required for this operation, nor does the phonograph have to be altered in any way. When installed, the user has at his command control means by which to produce turntable rotation at any one of several selected speeds each designed for records which call for that particular speed.

The present apparatus involves but few parts; it is simple in construction; and it may be operatively installed by anyone possessing little or no special mechanical skill. A suggestive embodiment of the invention is illustrated in the accompanying drawings wherein—

Figure 1:
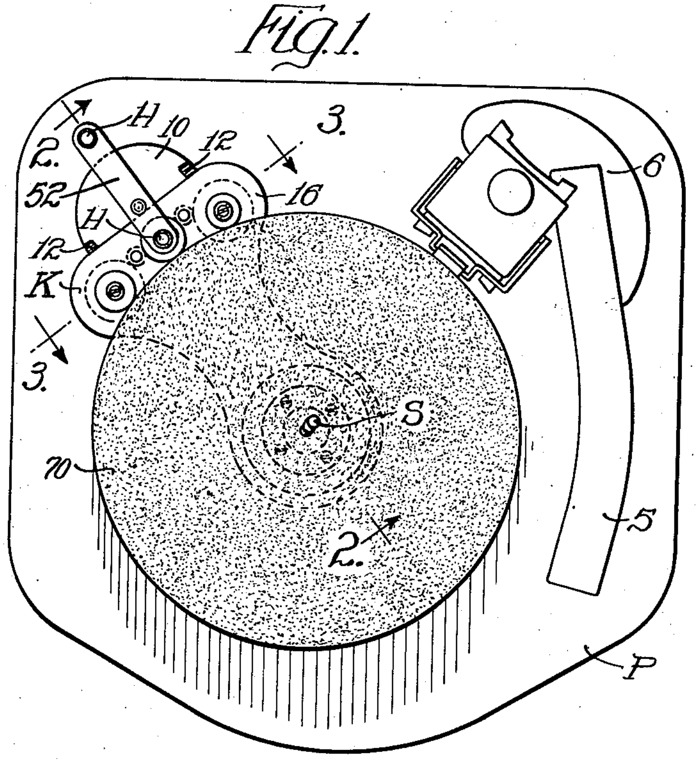
Figure 1 is a top plan view of a phonograph to which the present change-speed mechanism is operatively applied.

The phonograph illustrated is provided with the usual platform P from which rises a spindle S to traverse the central opening in a turntable T which is mounted for rotation at an elevation slightly above the platform. A tone arm 5 is supported from a mounting 6 at one side of the turntable for swinging movement thereover so that the stylus which it carries may engage with the grooves of a record when placed upon the turntable. The turntable may be provided with a depending flange 7 forming a peripheral rim therefor. This rim receives engagement from a friction wheel 8 which is driven from a motor M that is mounted below the platform. In some such way as this the turntable is driven at a constant speed whenever the motor is set in operation.

The change-speed mechanism of my invention makes use of a bracket arm K one end of which is secured to the platform adjacent the turntable, the bracket being formed to extend over the turntable and beyond the center thereof. As shown, the outer end of the bracket is in the form of a foot 10 from which depends a vacuum cup 11 and inwardly thereof a pair of spaced lugs 12. The cup and lugs provide a three-point support for the foot upon the platform. When the air is expelled from the cup as an incident to pressing the latter against the platform, the foot will be secured substantially immovably thereto.

At its inner end the foot 10 joins with a leg 15 which rises vertically to a point above the turntable where the bracket continues on horizontally in the form of an arm 16. At its inner end the arm is enlarged and apertured at 17 and adjacent thereto is downset at 18 to provide a seat for a self-lubricating bushing 19 of oilite or the like. This bushing is disposed concentrically with the spindle S and with the aperture 17 in the bracket arm. The arm thus extended over the turntable is supported entirely from the platform outwardly thereof by the means already described. The width of this arm, best shown in Fig. 1, is desirably varied according to the requirements at each point longitudinally thereof.

Figure 3:
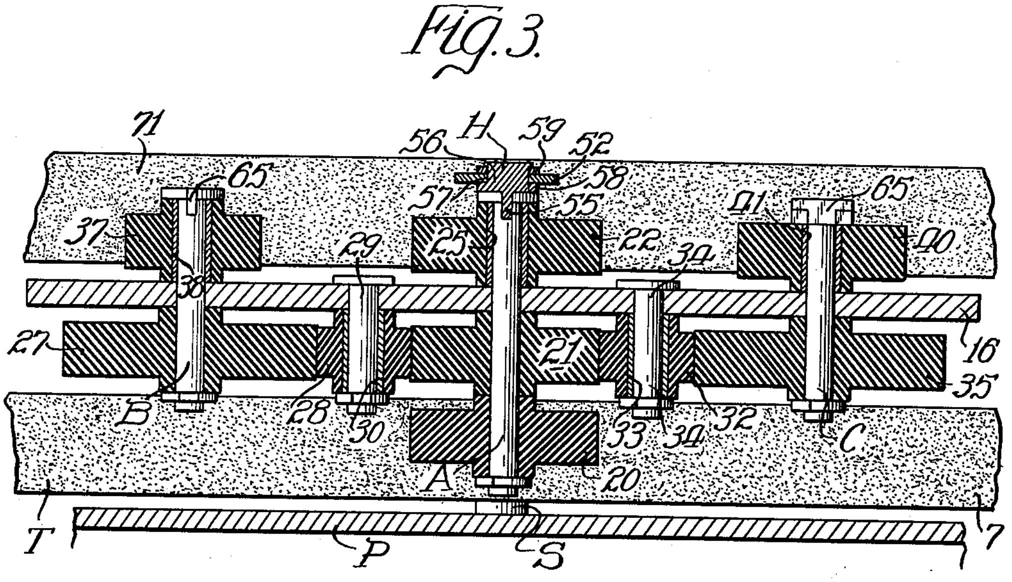
Fig. 3 is a similar view taken on line 3—3 of Fig. 1.

Referring particularly to Fig. 3, the bracket arm 16 furnishes a mounting for a plurality of vertical shafts such as the three shafts A, B and C which are illustrated. The axes of these shafts are disposed in an arc that is nearly concentric with the turntable. The center shaft A carries a friction wheel 20 of rubber or the like which is engaged with the depending rim 7 of the turntable. This wheel is fitted non-rotatably upon the shaft as is also a driving wheel 21 which is disposed just above the turntable T so as to be free of engagement therewith. The shaft A extends upwardly beyond the supporting arm 16 to carry another wheel 22, also of rubber or the like. This last wheel is equipped with a self-lubricating bushing 25 so as to be freely rotatable upon the shaft except when locked thereto by means which will be presently described.

Upon the shaft B is carried fast a friction wheel 27 spaced from the driving wheel 21 but interconnected therewith by an idler wheel 28 which is mounted for rotation upon a shaft 29 having a fixed depending mounting upon the arm 16. To reduce friction a self-lubricating bushing 30 is fitted within the idler wheel 28. On the other side of the driving wheel 21 is another idler wheel 32 equipped with a self-lubricating bushing 33 for free rotation upon a shaft 34 which depends from the bracket arm 16. This idler wheel 32 is in engagement with the driving wheel 21 and with a driven wheel 35 that is mounted fast on the shaft C. The driving wheel 21 and the two trains of wheels driven thereby are aligned at an elevation slightly above the turntable T so as to be free therefrom. It will be apparent that when the turntable is rotated the friction wheel 20 will be driven thereby to cause rotation of the driving wheel 21 which transmits rotary movement unidirectionally to the outermost wheels 27 and 35 in the two trains which end with the shafts B and C, respectively.

The shaft B which extends upwardly through the bracket arm 16 carries a wheel 37 of rubber or the like which is equipped with a self-lubricating bearing 38 for free rotation on the shaft. A similar wheel 40 equipped with a self-lubricating bearing 41 is also carried upon the upper end of the shaft C which rises above the arm 16. The two wheels 37 and 40 are aligned with each other and with the wheel 22 in a top tier above the middle tier wherein the wheels 27, 21 and 35 are disposed. All three shafts A, B and C will be rotated in unison unidirectionally whenever the turntable T is in operation, but no motion will be communicated to any of the three wheels 22, 37 or 40 in the top tier unless and until a key head for this purpose is first operated in the manner now to be described.

Figure 2:
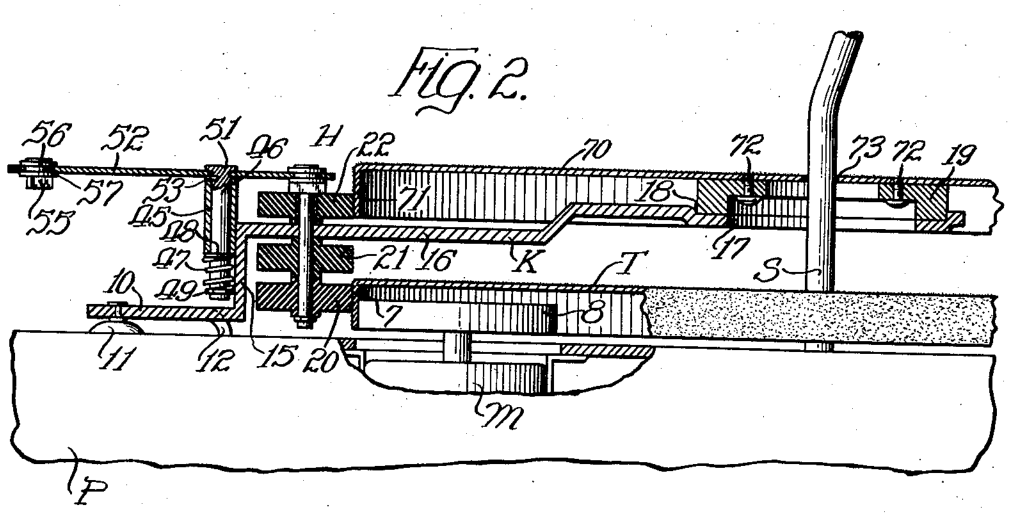
Fig. 2 is an enlarged fragmentary section, taken on line 2—2 of Fig. 1.

In Fig. 2 is shown an upstanding tubular housing 45 which is affixed to the leg 15 to support therein a plunger 46 around whose lower end is coiled a spring 47 whose opposite ends engage a collar 48 at the lower end of the tube and a collar 49 that is carried by the plunger. The spring biases the plunger downwardly so that its head 51 at the top is in pressure engagement with a swinging lever arm 52 which is mounted fast on the plunger. An indexing pin 53 extending radially from the plunger is arranged to enter a selected notch 54 of which three are formed at the top end of the housing 45 (see Fig. 4). The lever arm extends for unequal distances on opposite sides of its mounting to carry at each end a head H each of which is a duplicate of the other. Each head comprises a key 55 depending from a cylindrical body 56 which is rotatably fitted into an opening 57 in the lever arm, the body being equipped with a shoulder 58 which engages the arm on its under side. A collar 59 is fitted around the body 56 to engage the lever arm on its upper side, and to secure the collar in place the body may be upset at its top to provide the requisite head for this purpose. The key head may be freely rotated in the lever arm end which carries it, and the spring biased plunger acts to press the key head downwardly for a purpose that will presently appear.

Figure 4:
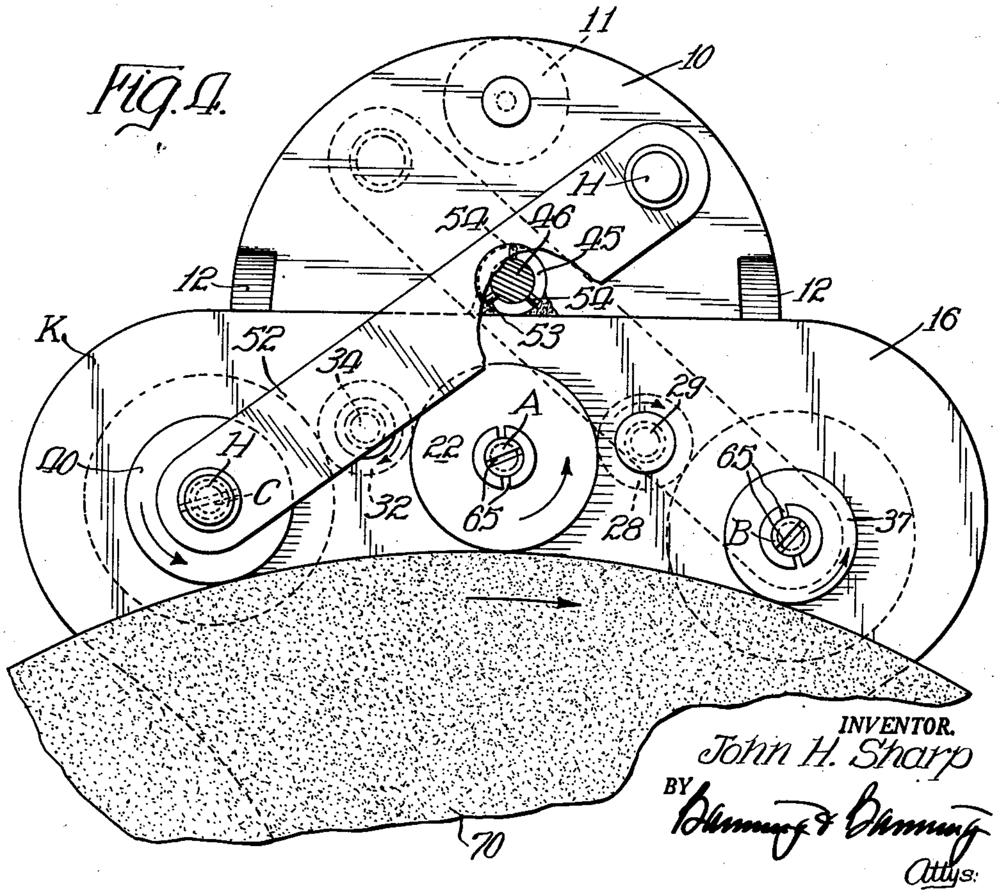
Fig. 4 is an enlarged detail in plan showing a fragment of the auxiliary turntable adjacent which the apparatus is operatively positioned.

The upper ends of the shafts A, B and C and of the bushings 25, 38 and 41 extend slightly above the top tier of wheels, and are slotted crosswise at 65 for reception of the key 55. The lever arm 52 may be swung to any one of several positions in order that one of its two key heads may be positioned operatively with respect to the top ends of the shafts A, B or C. Since the shaft A is the closest to the pivotal center of the lever arm, its short end is swung to a position adjacent this shaft, as shown in Fig. 1, when it is desired to establish a driving connection between the shaft A and the wheel 22 which otherwise is free with respect thereto. On the other hand, when a driving connection with either of the wheels on the outer shafts B or C is wanted, then the long end of the lever arm is swung to position its key head H operatively with respect thereto. The operative position required for a driving connection with either of the shafts B or C is indicated in Fig. 4 in full and dotted lines respectively. When the key 55 is operatively engaged with one of the slots 65, the shaft and surrounding bushing are so rotatively positioned as to align the cross slot of one with that of the other, and since the bushing is carried fast by the wheel wherein it is fitted, it follows that a driving connection between that wheel and the shaft is then established.

With an apparatus of this kind I employ an auxiliary turntable 70 having a depending marginal rim 71 which is disposed adjacent each of the three wheels 37, 22, and 40 in the upper tier. These several wheels while remaining in frictional contact with the rim 71 offer little or no resistance to its free rotation. This auxiliary turntable is carried fast on the bushing 19 to which it may be secured by screws 72, and its diameter is substantially that of the lower turntable T with which the phonograph is regularly equipped. A center opening 73 is provided in the upper turntable to receive the spindle S.

In operation one of the key heads will be engaged with a selected shaft A, B or C. The wheels which are mounted on these shafts are of the requisite diameters to establish a train which will produce a rotational speed of the end wheels 37, 22, or 40 such that the auxiliary turntable 70 will be rotated at one of the three speeds desired. For example, if it is the customary 78 R. P. M., then the drive will be through the upper wheel 22 which is connected fast to the shaft A through the medium of the key head when positioned operatively as shown in Fig. 3. The two wheels 20 and 22 upon this shaft are of the same size, so the driving ratio is 1 to 1. On the other hand, if either of the lower speeds is desired, then the lever arm 52 will be swung to present the key head at its opposite end in operative engagement with one of the other two shafts B or C as desired. In this way, a rotational speed for the auxiliary turntable 70 may be obtained according to the wishes of the user. A record requiring any one of the three selected speeds may then be used on the turntable when the parts are properly operated for this purpose.

Engagement and disengagement of the key heads with the shafts wherewith they establish driving connections require that the lever arm be shifted vertically the slight distance that is requisite for the axial movement involved, but the spring tension of the spring 47 acting through the plunger 46 will assure a maintenance of the driving connection when once established.

In summary, the change-speed mechanism of my invention is characterized by three wheel trains each incompletely connected, a common driving wheel therefor receiving its motion from the power-operated turntable, an auxiliary turntable engaged by the end wheel of each train to be driven thereby when one of the driving connections is completed, and a key movable through a fixed path to complete the operative connection for a selected wheel train whose driving ratio is different from that of the other two, the entire assembly being a unitary structure applicable to existing phonographs without alteration thereof.

I claim:

1. Change-speed mechanism for a phonograph having a power-driven turntable comprising a fixedly mounted bracket arm extended alongside and closely over the turntable, an auxiliary turntable mounted for rotation on the bracket arm over the phonograph turntable and concentrically therewith, a friction wheel carried by the bracket arm in engagement with the rim of the phonograph turntable to be driven thereby, plural trains of wheels in incomplete driving connection with the friction wheel to be rotated thereby, the plural trains having unlike driving ratios and ending in wheels in a common tier opposite the auxiliary turntable and in engagement with the rim thereof to transmit motion thereto, and a key movable through a fixed path into operative relation with a selected train of wheels to complete the driving connection to the end wheel thereof whereby to cause rotation of the auxiliary turntable at a predetermined speed.

2. A phonograph change-speed mechanism according to claim 1 in which the plural wheel trains are three in number each having a driving ratio different from that of the other two whereby the auxiliary turntable may be caused to operate at any selected one of three speeds.

3. The combination with a phonograph having a power-driven turntable and thereover, in concentric relation therewith, a freely rotatable auxiliary turntable, of a change-speed mechanism for driving the auxiliary turntable comprising a plurality of incompletely connected wheel trains each having an end wheel in engagement with the rim of the auxiliary turntable for transmission of rotation thereto, a friction wheel in driving connection with the wheel trains, and in engagement with the rim of the power-driven turntable to be driven thereby, a key movable for interposition in the transmission of each wheel train successively to complete the driving connections therefor, and means mounting the key and guiding the same through a fixed path between the several wheel trains.

4. A change-speed mechanism according to claim 3 in which each wheel train is mounted on a separate shaft with the end wheel freely rotatable on the upper end portion thereof and in which the top side of each end wheel and the top end of its supporting shaft is provided with means engageable by the key to lock the one non-rotatably to the other.

5. A unitary change-speed mechanism for a phonograph having a power-driven turntable, comprising an auxiliary turntable, plural wheel trains incompletely connected and having end wheels in engagement with the rim of the auxiliary turntable for transmission of rotation thereto and having a common friction wheel in engagement with the rim of the power-driven turntable to be driven thereby, a single means for selectively completing connections in the wheel trains, one at a time, to establish a driving connection therethrough to the auxiliary turntable, a carrier for the connection-completing means movable through a fixed path successively from one operative position to another and a common mounting for the auxiliary turntable and the wheel trains permitting operative positioning thereof as a single unit.

6. The combination with a phonograph having a power-driven turntable and thereover, in concentric relation therewith, a freely rotatable auxiliary turntable, of a change-speed mechanism for driving the auxiliary turntable comprising three incompletely connected wheel trains each having an end wheel in engagement with the rim of the auxiliary turntable for transmission of rotary motion thereto, a friction wheel in driving connection with each of the wheel trains and in engagement with the rim of the power-driven turntable to be driven thereby, a pair of keys selectably movable for interposition, one at a time, in the transmission of certain of the wheel trains to complete the driving connections therefor, and means mounting the two keys and guiding the same selectively through a fixed path to and from operative positions.

7. A change-speed mechanism according to claim 6 in which each wheel train has a driving ratio different from that of the other two whereby the auxiliary turntable may be caused to operate at any selected of three speeds.

8. A change-speed mechanism according to claim 6 in which each wheel train is mounted on a separate shaft with the end wheel freely rotatable on the upper end portion thereof and in which the top side of each end wheel and the top end of its supporting shaft is provided with means engageable by one of the keys to lock the one non-rotatably to the other.

9. A change-speed mechanism according to claim 6 in which each wheel train is mounted on a separate shaft with the end wheel freely rotatable on the upper end portion thereof, in which the top side of each end wheel and the top end of its supporting shaft is provided with means engageable by one of the keys to lock the end wheel non-rotatably to its shaft, and in which the key mounting means comprises a lever arm rotatable about a vertical axis and is provided with associated means resilient in a vertical plane whereby to maintain each key in its operative engaging position with a selected shaft and end wheel carried thereby.

10. A change-speed mechanism according to claim 6 in which each wheel train is mounted on a separate shaft with the end wheel freely rotatable on the upper end portion thereof, in which the top side of each end wheel and the top end of its supporting shaft is provided with means engageable by one of the keys to lock the end wheel non-rotatably to its shaft, in which the key mounting means comprises a lever arm rotatable about a vertical axis unequally distant from one of the wheel trains and whereby two keys are carried by the lever arm near opposite ends thereof, each at the requisite radial distance for operative engagement with one wheel train to complete the driving connection therefor.

11. A change-speed mechanism according to claim 6 in which each wheel train has a driving ratio different from that of the others whereby the auxiliary turntable may be caused to operate at any selected of three speeds, in which each wheel train is mounted on a separate shaft with the end wheel freely rotatable on the upper end portion thereof, in which the top side of each wheel and the top end of its supporting shaft is provided with means engageable by one of the keys to lock the end wheel non-rotatably to its shaft, in which the key mounting means comprises a lever arm rotatable about a vertical axis equally distant from two of the wheel trains and unequally distant from the third wheel train, and whereby two keys are carried by the lever arm near opposite ends thereof, one key at the requisite radial distance for operative engagement selectively with two wheel trains to complete the driving connections therefor and the other key at the requisite radial distance for operative engagement with the third wheel train to complete the driving connection therefor.

JOHN H. SHARP.

REFERENCES CITED

The following references are of record in the file of this patent:

UNITED STATES PATENTS

| Number | Name | Date |
|---|---|---|
| 326,861 | Gass | Sept. 22, 1885 |
| 1,151,762 | Day | Aug. 31, 1915 |
| 1,852,456 | Fritz | Apr. 5, 1932 |

FOREIGN PATENTS

| Number | Country | Date |
|---|---|---|
| 815,602 | France | Apr. 12, 1937 |